United States Patent
Hashimoto et al.

[11] Patent Number: 6,031,213
[45] Date of Patent: Feb. 29, 2000

[54] ELECTRODE STRUCTURE AND ELECTRIC HEATER COMPRISING THE SAME

[75] Inventors: Shigeharu Hashimoto, Okazaki; Tadato Ito, Nagoya; Yuichi Shimasaki, Utsunomiya; Hiroaki Kato, Utsunomiya; Takashi Komatsuda, Utsunomiya; Akihisa Saito, Utsunomiya; Takuya Aoki, Shimotsuga-gun; Tetsu Teshirogi, Aizuwakamatsu, all of Japan

[73] Assignees: NGK Insulators, Ltd.; Honda Giken Kogyo Kabushiki Kaisha, both of Japan

[21] Appl. No.: 08/567,326

[22] Filed: Dec. 5, 1995

[30] Foreign Application Priority Data

| Dec. 7, 1994 | [JP] | Japan | 6-303834 |
| Dec. 19, 1994 | [JP] | Japan | 6-334493 |
| Dec. 28, 1994 | [JP] | Japan | 6-326663 |
| Dec. 1, 1995 | [JP] | Japan | 7-314001 |

[51] Int. Cl.⁷ .................. H05B 3/08; F01N 3/10
[52] U.S. Cl. ............... 219/541; 60/30; 422/174
[58] Field of Search .................. 219/205, 206, 219/207, 541; 422/174, 180; 60/300; 55/DIG. 30; 439/519

[56] References Cited

U.S. PATENT DOCUMENTS

| 1,683,067 | 9/1928 | Dubilier | 219/523 |
| 2,876,322 | 3/1959 | Boggs et al. | 219/541 |
| 3,113,284 | 12/1963 | Inthoudt | 219/541 |
| 3,310,769 | 3/1967 | Simmons | 219/523 |
| 3,839,623 | 10/1974 | Portmann | 219/541 |
| 4,477,717 | 10/1984 | Walton | 219/541 |
| 5,034,595 | 7/1991 | Grendys | 219/541 |
| 5,238,650 | 8/1993 | Sheller et al. | 422/174 |
| 5,245,825 | 9/1993 | Ohhashi et al. | 60/300 |
| 5,247,158 | 9/1993 | Steinhauser et al. | 219/541 |
| 5,259,190 | 11/1993 | Bagley et al. | 60/300 |
| 5,318,756 | 6/1994 | Sheller et al. | 422/174 |
| 5,571,485 | 11/1996 | Brunson | 422/174 |
| 5,626,785 | 5/1997 | Rajnik et al. | 219/541 |

FOREIGN PATENT DOCUMENTS

| 0 532 138 A2 | 3/1993 | European Pat. Off. . |
| 0 618 353 A1 | 10/1994 | European Pat. Off. . |
| 50-72195 | 6/1975 | Japan . |
| 58-63779 | 4/1983 | Japan . |
| 61-88282 | 6/1986 | Japan . |
| 62-189153 | 8/1987 | Japan . |
| 3-65350 | 3/1991 | Japan . |
| 4-279635 | 10/1992 | Japan . |
| 5-138819 | 6/1993 | Japan . |
| 5-258926 | 10/1993 | Japan . |
| 6-239976 | 8/1994 | Japan . |
| 6-256625 | 9/1994 | Japan . |
| 6-78705 | 11/1994 | Japan . |
| WO 92/02714 | 2/1992 | WIPO . |

*Primary Examiner*—Sang Paik
*Attorney, Agent, or Firm*—Parkhurst & Wendel, L.L.P.

[57] ABSTRACT

An electrode structure includes: a metallic electrode; a case for accommodating and holding the electrode, and one end of a lead wire connecting to the electrode; and an insulating member interposed between the electrode and the case in order to ensure insulation between the electrode and the case, in which structure a waterproof member is interposed between the case and the lead wire in order to prevent the incoming of water from between the case and the lead wire, and an electric heater havinging the above electrode structure. An electrode structure of an electric heater, includes: a first electrode; a second electrode of a cylinder shape, having a base portion connected with the first electrode and a top end portion connected with a lead wire; an insulating member having a thermal resistance, pierced by the second electrode; an elastic insulator having a thermal resistance, covering at least a portion of the second electrode; a case for accommodating and holding the second electrode, having a predetermined length L; and a rubber sealing member attached to the top end of the case. The electrode structure is preferably used by connecting to a conductive substance accommodated in a metallic housing, to apply electricity to the conductive substance. The conductive substance is preferably a metallic honeycomb structure. The given length L mentioned above is preferably L≧40 mm.

35 Claims, 22 Drawing Sheets

FIG. 21 (A) PRIOR ART
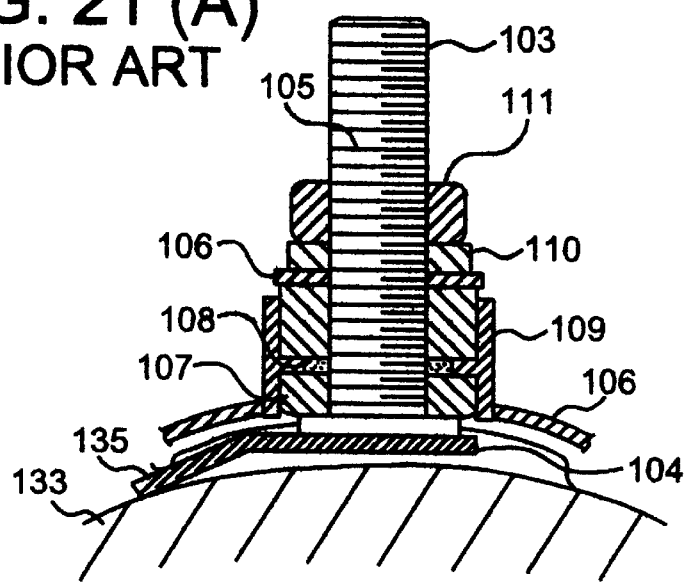
FIG. 21 (B) PRIOR ART
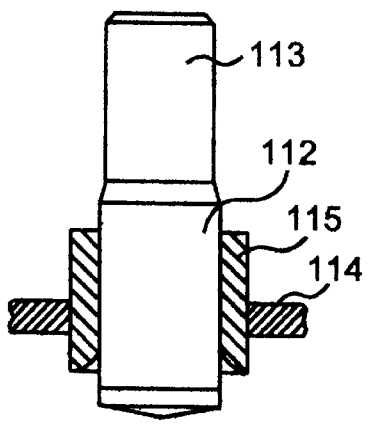
FIG. 21 (C) PRIOR ART
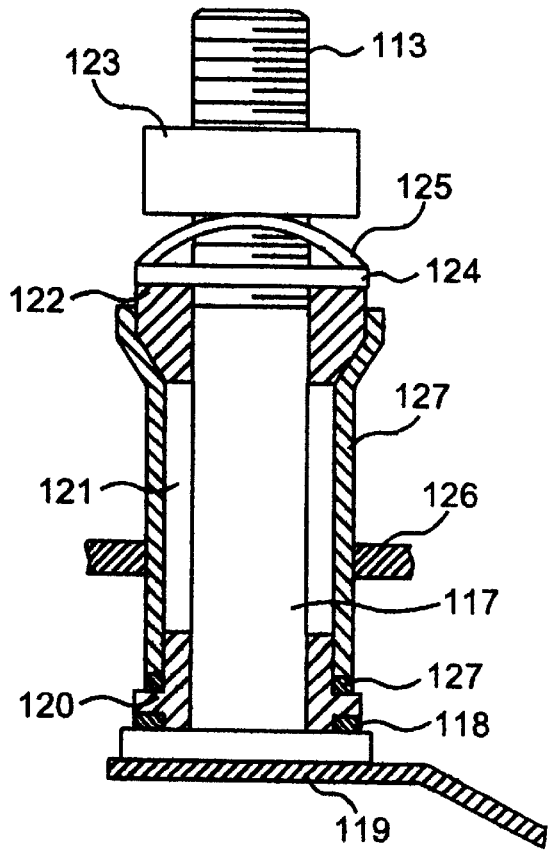

ELECTRODE STRUCTURE AND ELECTRIC HEATER COMPRISING THE SAME

BACKGROUND OF THE INVENTION

(1) Field of the Invention

The present invention relates to an electrode structure and an electric heater comprising the electrode structure. More particularly, the present invention relates to an electrode structure provided in an exhaust gas system of an internal combustion engine and connected to, for example, a conductive substance accommodated in a metallic housing in order to apply electricity to the conductive substance to heat it and thereby purify the exhaust gas generated during the cold periods (e.g. cold start) of engine, as well as to an electric heater comprising the electrode structure.

(2) Description of the Prior Art

A technique is known in which, in a catalytic converter used for purification of the exhaust gas generated in automobiles, etc., an electric heater is provided to raise the temperature of the converter catalyst to its working temperature as quickly as possible.

In this technique, as shown in FIG. 20, an electric heater 101 and an auxiliary catalyst 102 are provided upstream of a main catalyst 100, that is, between an engine and the main catalyst 100 in an exhaust pipe 150, to purify harmful substances present in the exhaust gas generated during cold engine periods. In this system for exhaust gas purification, when the main catalyst 100 is not activated (for example, during cold engine periods such as cold start and the like), the electric heater 101 is put in an ON operation for a given length of time (e.g. 40 seconds) to raise the temperatures of the electric heater 101 and the auxiliary catalyst 102 to respective given temperatures (e.g. 400–500° C.) or above to activate the electric heater 101 and the auxiliary catalyst 102 in a short time and allow the electric heater 101 and the auxiliary heater 102 to conduct gas purification during cold engine periods. After the engine has been warmed up, purification of harmful substances present in the exhaust gas is conducted by the electric heater 101, the auxiliary heater 102 and the main catalyst 100.

The above electric heater generally comprises: a metallic honeycomb structure; a metallic housing (e.g. a can) for accommodating and holding the honeycomb structure; and an electrode for applying electricity to the honeycomb structure which is a conductive substance.

As electrode structures of electric heaters, there have conventionally been known those shown in FIGS. 21(A)–21(C).

In FIG. 21(A), a positive screw portion 103 is provided by carving. An electrode pole 105 Is fixed by an electrode 104. A first and a second insulating members 106 and 107, respectively, are engaged with the electrode pole 105 around the electrode pole 105. In a gap between the first insulating member 106 and the second insulating member 107 is placed a ceramic powder 108 such as cement. The ceramic powder 108 is packed in a space formed by the first and the second insulating members 106 and 107 and a fixing ring 109. On the electrode pole 105, a nut 111 is thread-mounted via a washer 110. Thus, the first and the second insulating members 106 and 107, and the like are fixed to the electrode pole 105.

In the conventional embodiment shown in FIG. 21(A), an electrical insulation against a metallic housing (case) 160, which works as an exhaust pipe, is ensured by the first and the second insulating members 106 and 107. An exhaust gas is sealed by the ceramic powder 108. The electrode 104 inside the metal housing 160 is connected with a part of honeycomb structure 133 by means of a metallic connecting member 135.

FIG. 21(B) shows another electrode structure called a plasma coating type. An insulating member 112 such as ceramic is coated on a predetermined portion of a pole by a discharge of plasma so as to obtain an electrode pole 113. The electrode pole 113 is inserted in and engaged with a ring 115 fixed to a metallic housing 114.

In this plasma coating type of electrode structure, the aforementioned coated portion having the insulating member 112 is forcibly inserted in and engaged with the ring 115, by which an electrical insulation against a metallic housing and a sealing against an exhaust gas are ensured.

FIG. 21(C) shows still another electrode structure called a metal seal type. The top end portion of an electrode pole 117 is provided with a positive screw portion 116 by curving. The electrode pole 119 is fixed to an electrode 117. A first insulating member 120 and a second insulating member 122 are engaged with the electrode pole 117 therearound. The first insulating member 120 is provided with a first ring 118 and a second ring 127 on both the upper and the lower surfaces of a protrusion. That is, an electrode structure of a metal seal type is provided with the first insulating member 120 and the second insulating member 122 are fixed in predetermined places by a net 123 and inserted in and engaged with a metallic housing 126.

The metal seal type of electrode structure is electrically insulated against a metal housing 126 by the first and the second insulating members 120 and 122 and sealed against exhaust gas by the first and the second metallic ring 118 and 127.

In the electric heater comprising such an electrode structure, there is preferred, for conveniences such as easy fitting to an exhaust pipe of an automobile, etc., an electrode structure which is connected to a lead wire connecting to an external electric source and in which one end of the lead wire is contained for reliable electrical connection between the electrode and the lead wire. This electrode structure, however, has problems in that, when an automobile is driven in rainy weather, etc. on rain puddles of roads or during flooding, water adheres onto the electrode of the electric heater 101, which may cause electrical short-circuiting and consequent misoperation of heater (see FIG. 22).

SUMMARY OF THE INVENTION

In view of the above situation, the present invention has been made to provide an electrode structure for electric heater, which can prevent the adhesion of water to the electrode of the heater even when an automobile provided with such an electric heater is driven through rain puddles or during flooding, as well as an electric heater comprising such an electrode structure.

According to the present invention, there is provided an electrode structure comprising: a metallic electrode; a case for accommodating and holding the electrode, and one end of a lead wire connecting to the electrodes and an insulating member interposed between the electrode and the mass in order to ensure insulation between the electrode and the case, in which structure a waterproof member is interposed between the case and the lead wire in order to prevent the incoming of water from between the case and the lead wire, and an electric heater comprising the above electrode structure.

According to the present invention, there is further provided an electrode structure of an electric heater, comprising: a first electrode; a second electrode of a cylinder shape, having a base portion connected with the first electrode and a top end portion connected with a lead wire; an insulating member having a thermal resistance, pierced by the second electrode; an elastic insulator having a thermal resistance, covering at least a portion of the second electrode; a case for accommodating and holding the second electrode, having a predetermined length L; and a rubber sealing member attached to the top end of the case.

The electrode structure of the present invention is preferably used by connecting to a conductive substance accommodated in a metallic housing, to apply electricity to the conductive substance. The conductive substance is preferably a metallic honeycomb structure.

The given length L mentioned above is preferably $L \geq 40$ mm.

BRIEF DESCRIPTION OF THE DRAWINGS

FIGS. 21(A), 21(B), and 21(C) are sectional views showing embodiments of conventional electrode structures.

DESCRIPTION OF THE PREFERRED EMBODIMENT

Figure 1:
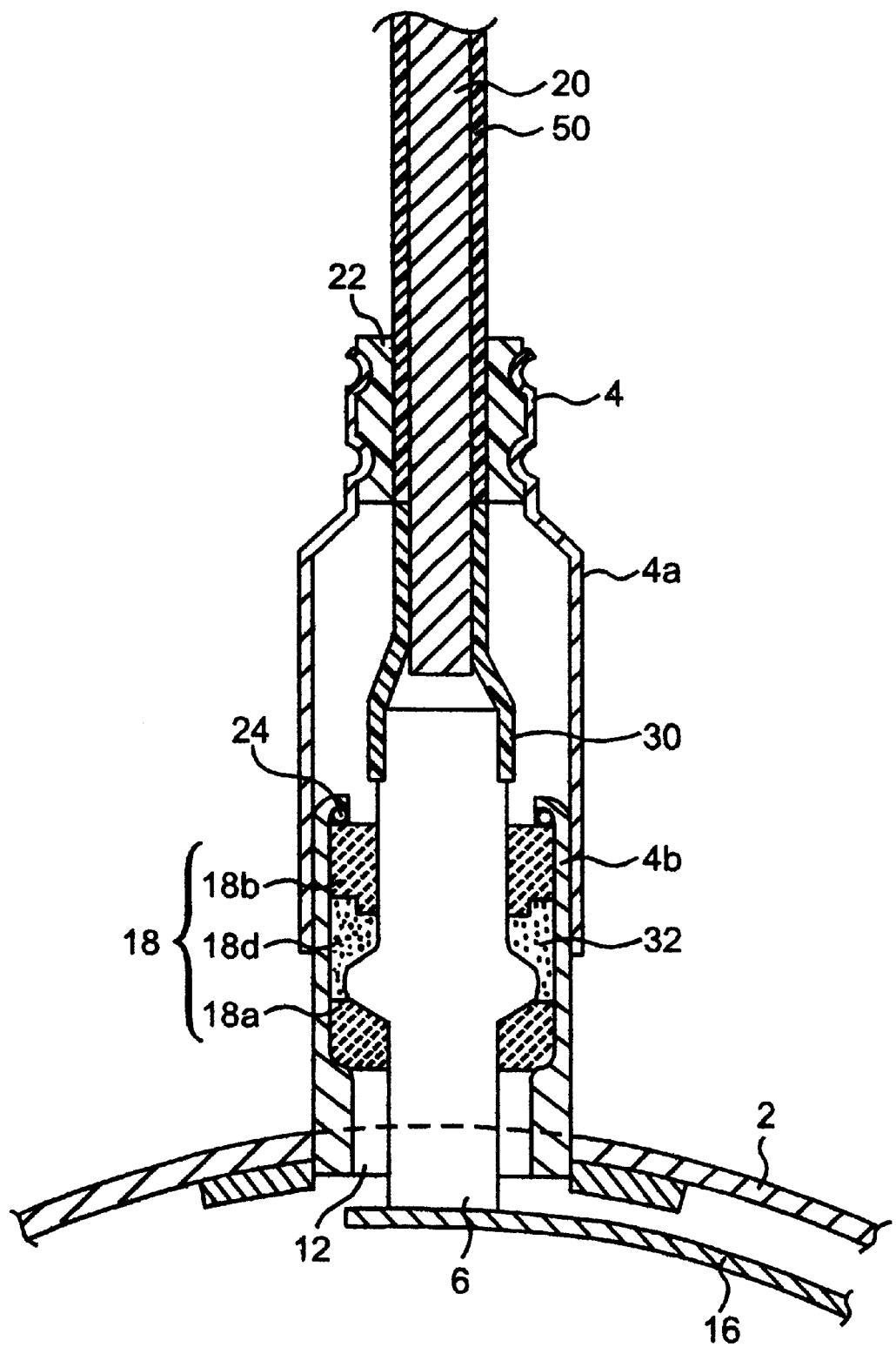
FIG. 1 is a sectional view showing an embodiment of the electrode structure of the present invention.

The electrode structure according to the present invention ie hereinafter described specifically. Description is made first on the members constituting the electrode structure.

The waterproof member used in the electrode structure of the present invention, is preferably a heat-resistant insulating organic compound or a glass. Specific examples of the insulating organic compound are preferably fluorine-containing organic compounds such as polytetrafluoroethylene (trade name: Teflon), fluororubber and the like, with Teflon being particularly preferred for its low weight decrease at high temperatures. Teflon may contain a glass for higher heat resistance. The heat resistance of the waterproof member is preferably at least 100° C., more preferably at least 150° C.

In the present electrode structure, the case is preferably crimped from outside at the portion where the waterproof member is interposed between the case and the lead wire, to ensure waterproofness inside the electrode. The waterproofness inside the electrode can also be ensured by, in place of employing the crimping, sealing the gap between the case and the waterproof member and/or the gap between the waterproof member and the lead wire with an adhesive. Herein, the waterproofness inside the electrode is preferably set at 1 cc/min or lees in terms of the amount of water incoming at 0.5 atm. Preferably, the adhesive has a large expansion coefficient so as to be able to follow the repetition of high temperature and low temperature as encountered in the exhaust system of automobile and also has water repellency for possible contact with water. A preferable adhesive is, therefore, an organic adhesive and specific examples thereof are a polyimide, etc.

The circumference of the lead wire is ordinarily covered with a covering material. The covering material preferably has a heat resistance of at least 100° C. Specific examples of the covered lead wire are a lead wire comprising a core and TEFLON (polytetrafluoroethylene) covering the circumference of the core, and a lead wire comprising a core, a polyimide tape covering the circumference of the core and a knitted and braided glass fiber covering the polyimide tape. The diameter of the core of the lead wire is preferably 1.0–5.0 mm. The core is preferably one obtained by inter-twisting thin wires each having a diameter of 0.5 mm or less.

The electrode is preferably a metal rod. The electrode is fixed to the case connecting to a metallic housing, via an insulating member. One end of the electrode located inside the housing is connected, directly or via a metallic connecting member, to part of a conductive substance accommodated in the metallic housing by welding or the like.

Meanwhile, the other end of the electrode is connected to the lead wire. The connection between the electrode and the lead wire is conducted by various methods such as direct welding, via connecting member and the like.

The insulating member is preferably constituted by a first insulator, a second insulator and an inorganic powder filled between the first insulator and the second insulator, because this constitution has excellent gas sealability and, even when the solid matters incoming from outside the exhaust pipe collide with the electrode structure, hardly reduces the gas sealability and insulating property. The inorganic powder is filled preferably by pressurization. The specific material for the inorganic powder is preferably talc, kaolin or the like. Each of the first and second insulators preferably has such a structure as to be able to hold the inorganic powder between the electrode and the case. The first and second insulators can be made of a ceramic material having a desired strength, for example, an alumina material or a porcelain material. Preferably, the inorganic powder is filled between the first and second insulators, for example, by applying a load of at least 200 kg. Allowing the second insulator to have different levels at the side being in direct contact with the inorganic powder is preferable because the filled inorganic powder does not get loose even when a heat cycle and/or a vibration is applied thereto.

The gap between the insulating member and the electrode and the gap between the insulating member and the case may be sealed with a metal sealing material; and simultaneously therewith, a spring member for absorbing the difference in thermal expansion between the electrode, the case and the insulating material and a pressing member for transmitting a load to the spring member may be provided between the electrode and the case. By constituting the present electrode structure as mentioned above, gas sealability can be maintained by the metal sealing material and the difference in thermal expansion between the electrode, the case and the insulating member can be absorbed by the spring member. The fixation of the pressing member to the electrode may be conducted by fitting a pressing member formed in a nut shape, to the electrode, or by caulking or welding part of the pressing member to the electrode.

The gap between the electrode and the case may be insulated by coating an insulating coating material on at least one of the electrode and the case, or on both of them. Pressure penetration of the electrode coated with the insulating coating material, into the case is preferable from the standpoint of gas sealability. The insulating coating material is preferably alumina, a ceramic or the like. It is preferable to use alumina by plasma spraying.

When the electrode is coated with the insulating coating material, it is preferable for the gas sealability of the electrode to seal the gap between the case and the insulating coating material with a metal sealing material; when the case is coated with the insulating coating material, it is preferable for the same reason to seal the gap between the electrode and the insulating sting material with the same metal sealing material.

Sealing the gap between the electrode and the case with an inorganic powder is preferable for the gas sealability and impact resistance of the electrode. The inorganic powder is filled preferably by pressurization, as mentioned above.

The gas sealability of the electrode can also be obtained by sealing the gap between the insulator, the case and the electrode with a cement sealing material.

The conductive substance is typically a metallic honeycomb structure. When the conductive substance is a metallic honeycomb structure, the electrode structure of the present invention is an electrode structure for an electric heater provided in, for example, a catalytic converter for purification of automobile exhaust gas. Various conductive substances other than metallic honeycomb structure can also be used.

The present invention is hereinafter described in more detail referring to the embodiments shown in the drawings. However, the present invention is in no way restricted to these embodiments.

FIG. 1 is a view showing an embodiment of the electrode structure according to the present invention. In FIG. 1, 2 is a metallic housing; 4 is a case for holding an electrode; 6 is an electrode consisting of a metal rod; 16 is a metallic connecting member; 18a is a first insulator; 18b is a second insulator; 18d is an inorganic powder: 20 is a lead wire; 22 is a waterproof member; and 24 is a caulking ring.

In the electrode structure shown in FIG. 1, the electrode 6 is inserted into a hole formed in the metallic housing 2 and is fixed to the case 4 connected to the metallic housing 2, via an insulating member 18 constituted by the first insulator 18a, the second insulator 18b and the inorganic powder 18d filled between the first insulator 18a and the second insulator 18b. In the embodiment of FIG. 1, the case 4 has a double structure in which a second case 4b is partially inserted into a first case 4a and in which the second case 4b is caulked at the circumference of the upper end via the caulking ring 24.

By using the caulking ring 24, the inorganic powder 18d can be filled by pressurization without applying an excessive stress to the second insulator 18b. It is preferable that the caulking ring 24 is made of a material having a thermal expansion coefficient larger than that of the second insulator 4b, because, when the electrode structure is heated, the caulking ring 24 can absorb the difference in thermal expansion between the second insulator 4b and the insulating member 18 and can ensure good sealability. It is also preferable that the first case 4a and the second case 4b are fixed by welding or the like over the entire circumference in order to prevent the incoming of water from the gap between the two insulators. The fixation is conducted preferably by laser welding over the entire circumference.

The waterproof member 22 is interposed between the case 4 and the lead wire 20, and the case 4 is caulked from outside at the portion where the waterproof member 22 is interposed between the case 4 and the lead wire 20. This can eliminate the gap between the case 4 and the waterproof member 22 and the gap between the waterproof member 22 and the lead wire 20, and ensures the prevention of water incoming from the gap between the case 4 and the lead wire 20. Between the upper end of the electrode 6 and the lower end of the lead wire 20 is provided a connecting member 30 for electrical connection between the electrode 6 and the lead wire 20. One end of the electrode 6 located inside the metallic housing 2 is connected to part of a conductive substance (not shown in FIG. 1) via the metallic connecting member 16.

The electrode structure of FIG. 1 is superior in assembling efficiency, productivity and gas sealability. The structure hardly reduces the gas sealability and insulating property even in collision with solid matters incoming from outside the exhaust pipe, and is strong and highly safe.

In the electrode structure of FIG. 1, when different levels 32 are formed at the lower side of the second insulator 18b, there occurs no loosening of the filling state of the inorganic powder 18d filled between the first insulator 18a and the second insulator 18b, even when the structure undergoes a heat cycle and/or a vibration.

Figure 2:
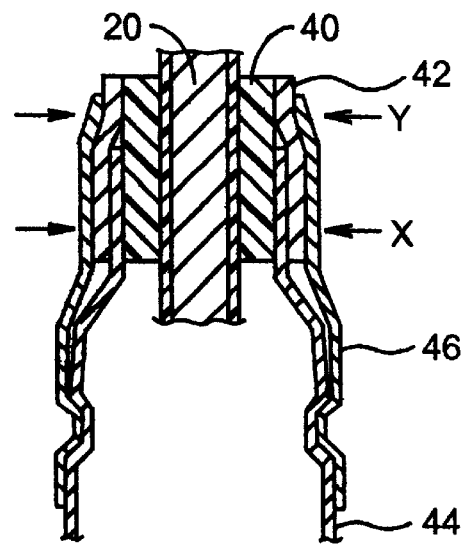
FIG. 2 is a partial sectional view showing an embodiment of another waterproof structure between electrode case and lead wire, used in the electrode structure of the present invention.

FIG. 2 is another embodiment of the waterproof structure between the case and the lead wire. In this embodiment, a lead wire 20 is covered with a first waterproof member 40 at the circumference; the lower portion of the first waterproof member 40 is clamped with a first case 44; round the upper portion of the first waterproof member 40 is wound a waterproof tube 42 such as TEFLON (polytetrafluoroethylene) tube or the like; the waterproof tube 42 is clamped with a second case 46; and the second case 46 is caulked from outside at the portions X and Y.

In this waterproof structure, in the portion X, since the waterproof tube 42 is clamped between the first case 44 and the second case 46, difference in thermal expansion hardly occurs and waterproofness is secured. Further, in the Y portion, since both the first waterproof member 40 and the waterproof tube 42 are caulked together, no water incoming occurs and very high waterproofness can be secured.

Figure 3:
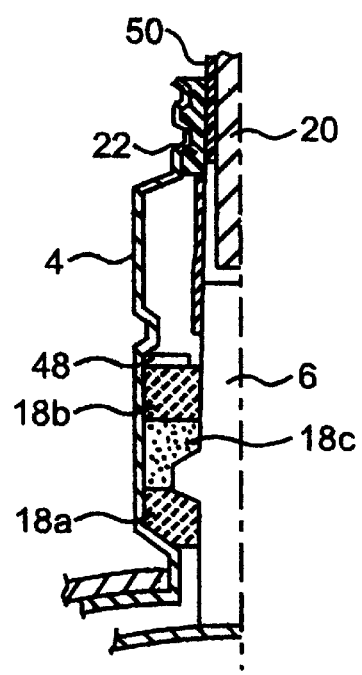
FIG. 3 is a partial sectional view showing another embodiment of the electrode structure of the present invention.

In an embodiment of FIG. 3, a one-piece case 4 is used in place of the case 4 of double structure shown in FIG. 1; an insulating member is interposed between the case 4 and an electrode 6; and a waterproof member 22 is interposed between the case 4 and a lead wire 20. The case 4 is caulked, via a caulking member 48, at the portion close to the upper and of a second insulator 18b.

Figure 4:
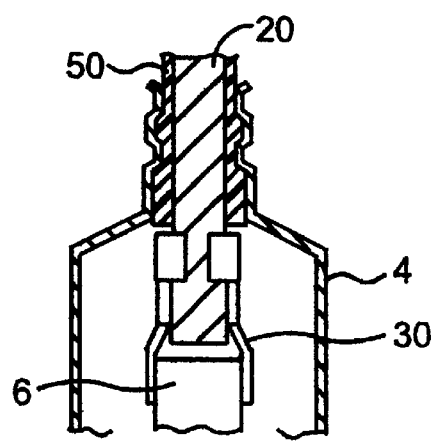
FIG. 4 is a partial sectional view showing still another embodiment of the electrode structure of the present invention.

FIG. 4 is still another embodiment of the waterproof structure between the case and the lead wire. In this embodiment, the covering material 50 for a lead wire 20 functions also as a waterproof member, and the covering material 50 is directly caulked from the circumference of a case 4. It is necessary or preferable that the covering material 50 for the lead wire 20 has the above-mentioned properties of a waterproof member. In this embodiment, therefore, the number of parts can be reduced and improved assembling efficiency can be obtained.

Figure 5:
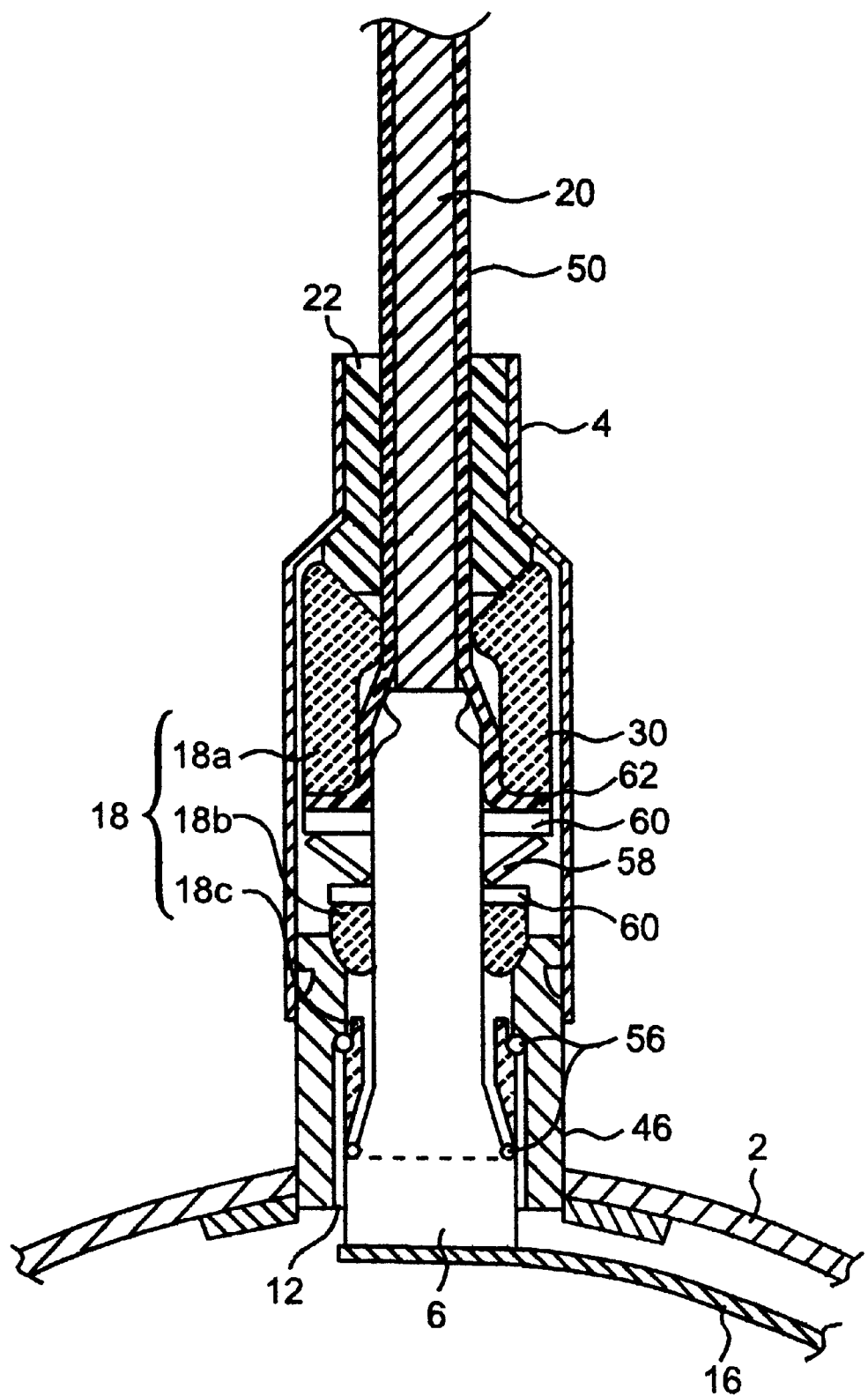
FIG. 5 is a partial sectional view showing still another embodiment of the electrode structure of the present invention.

FIG. 5 is an embodiment of the electrode structure according to the present invention, wherein the gap between the electrode and the insulating member (provided between the case and the electrode) and the gap between the insulating member and the case are each sealed with a metal sealing material.

Figure 30:
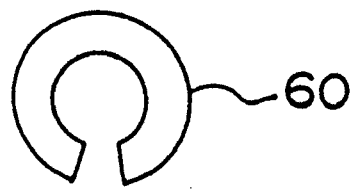
FIG. 30 is a plan view showing an embodiment of the pressing member used in the electrode structure of the present invention.

In the electrode structure shown in FIG. 5, a first insulator 18a, a second insulator 18b and a third insulator 18c are provided between a first case 44 or a second case 46 and a lead wire 20 or an electrode 6; the gap between the third insulator 18c and the second case 46 and the gap between the third insulator 18c and the electrode 6 are each sealed with a metal sealing material 56; a coned disc spring 58 is supported by pressing members 60 as shown in FIG. 30, at the top and the bottom; the upper pressing member 60 is supported by a flange 62 formed at the lower end of a connecting member 30.

The waterproof structure in the electrode structure of FIG. 5 is the same as shown in FIG. 1. The flange 62 provided at the lower end of the connecting member 30 transmits, together with the pressing member 60, a load applied to the electrode owing to the difference in thermal expansion, to the coned disc spring 58 efficiently.

Figure 6:
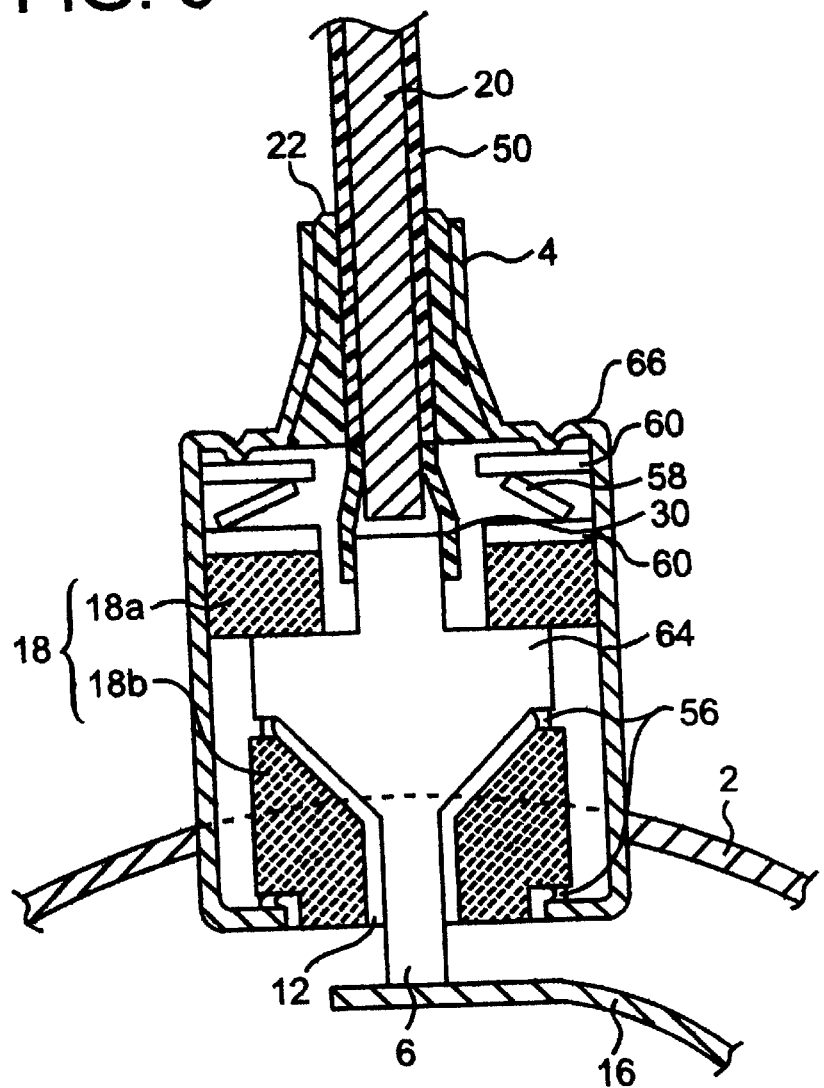
FIG. 6 is a partial sectional view showing still another embodiment of the electrode structure of the present invention.

FIG. 6 is another embodiment of the electrode structure according to the present invention, wherein the gap between the electrode and the insulating member (provided between the case and the electrode) and the gap between the insulating member and the case are each sealed with a metal sealing material.

In the electrode structure shown in FIG. 6, the gap between an electrode 6 and a case 4 is insulated by a first insulator 18a and a second insulator 18b; the gap between the second insulator 18b and the electrode 6 and the gap between the second insulator 18b and the case 4 are each sealed with a metal sealing material 56. The main differences of this electrode structure from the electrode structure of FIG. 5 are that the case 4 is formed in one piece, the electrode 6 has a portion 64 for supporting the first insulator 18a, and pressing members 60 are pressed onto a coned disc spring 58 by caulking the shoulder portion 66 of the case 4.

Figure 7:
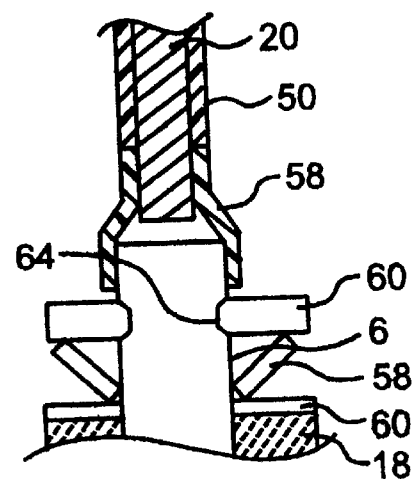
FIG. 7 is a partial sectional view showing an embodiment of the fixation between pressing member and electrode, used in the electrode structure of the present invention.

The fixation of pressing member 60 to electrode 6 may be conducted also by, as shown in FIG. 7, forming a pressing member-holding portion 64 at a desired position of an electrode 6 and fitting, to the portion, the inside of a pressing member 60 of partially-cut-ring shape (see FIG. 30).

Figure 8:
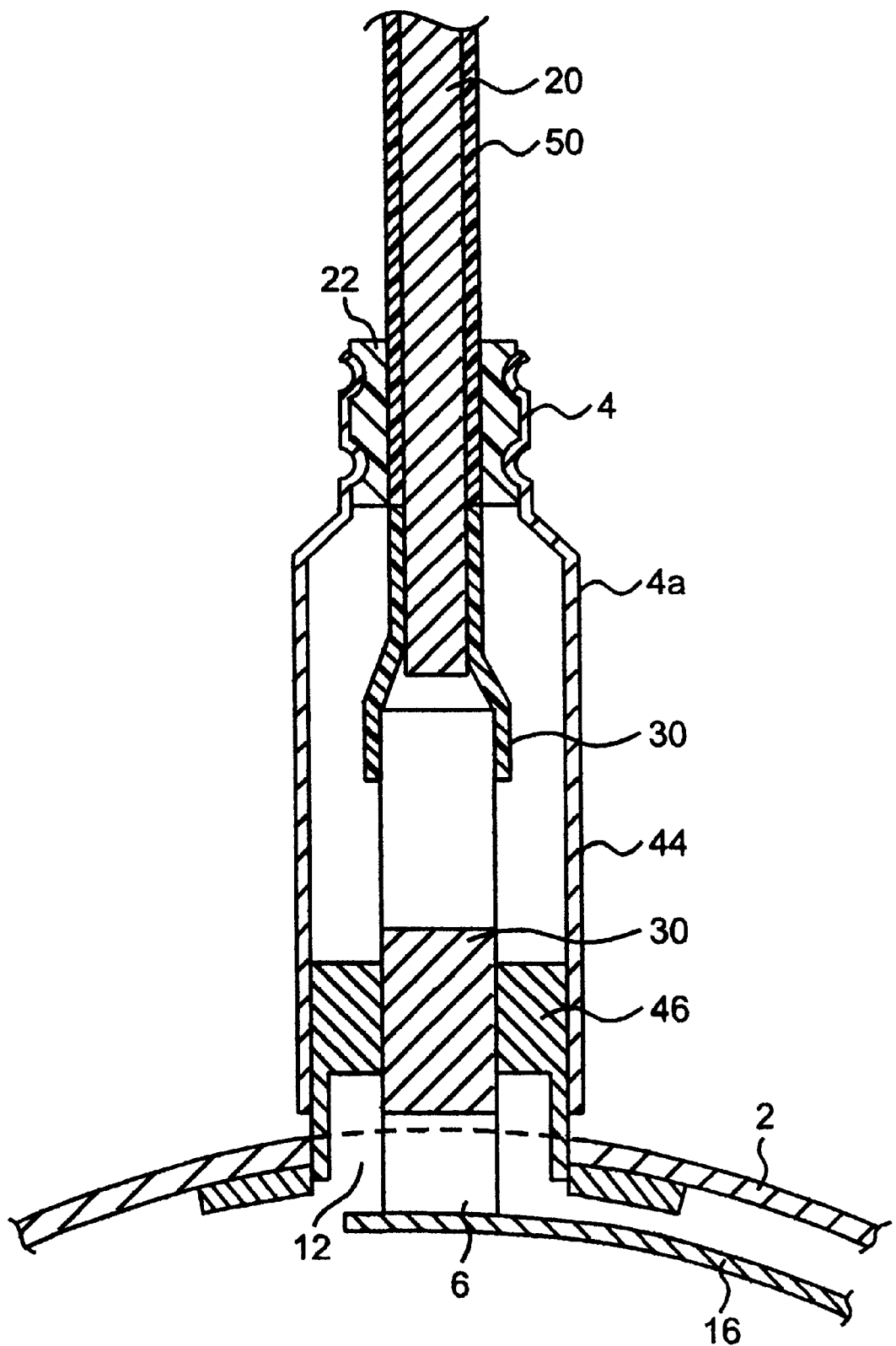
FIG. 8 is a partial sectional view showing still another embodiment of the electrode structure of the present invention.

FIG. 8 is an embodiment of the electrode structure of the present invention, wherein the electrode and the case are insulated by coating the electrode with an insulating coating material by plasma spraying. In this embodiment an electrode coated with an insulating coating material 18f is inserted into a second case 46 under pressure. In this electrode structure, the waterproof structure is the same as shown in FIG. 1.

Figure 9:
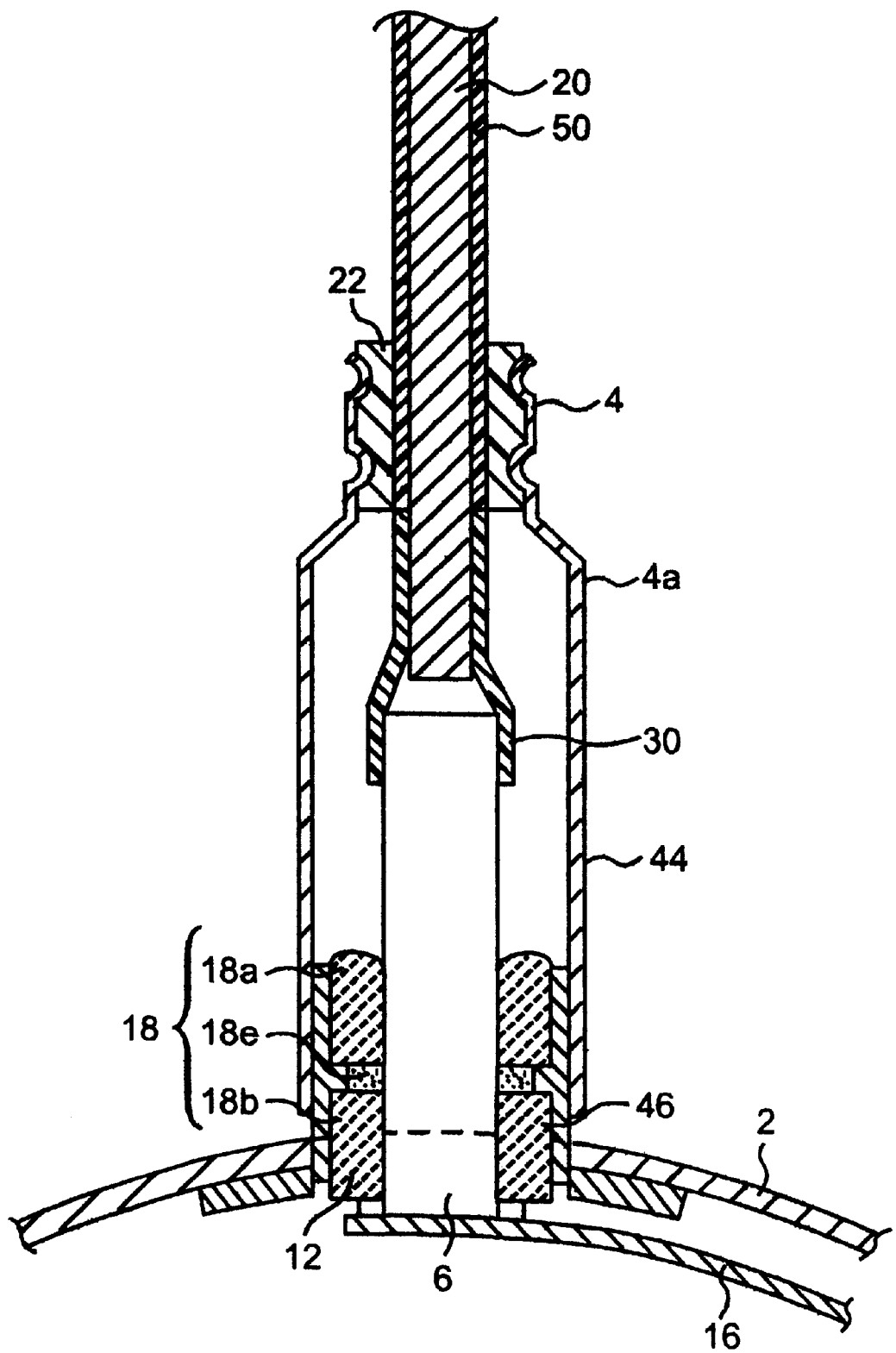
FIG. 9 is a partial sectional view showing still another embodiment of the electrode structure of the present invention.

FIG. 9 is an embodiment of the present electrode structure, wherein the gap between a first insulator 18a, a second insulator 18b and a second case 46 is sealed with a cement sealing material 18e. By having such a constitution, the electrode structure can have gas sealability. In this electrode structure, the waterproof structure is the same as shown in FIG. 1.

Figure 10:
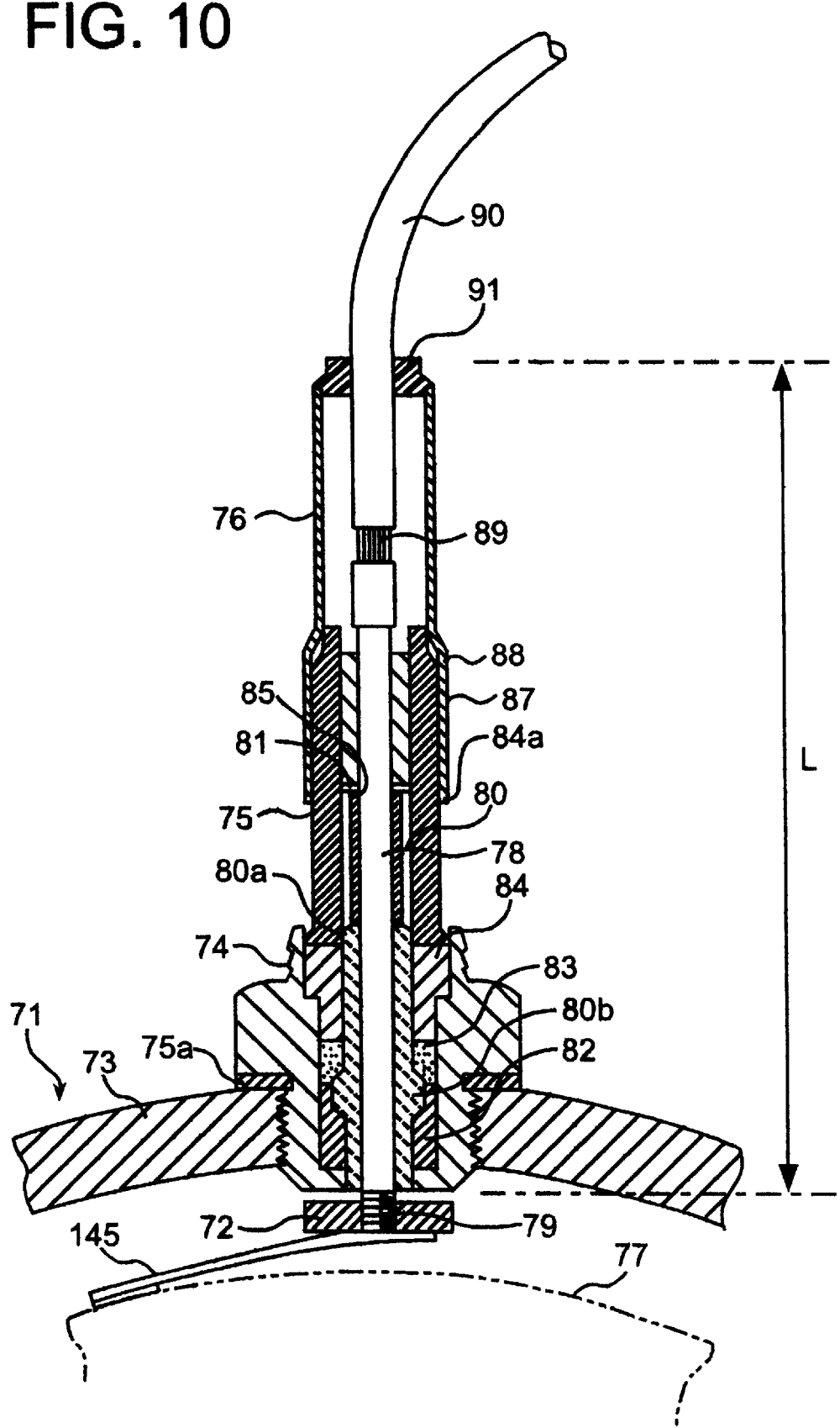
FIG. 10 is a sectional view showing still another embodiment of the electrode structure of the present invention.

FIG. 10 is a cross-sectional view showing still another embodiment of an electrode structure of an electric heater of the present invention.

In the figure, a first electrode 72 of an electric heater 71 on which a catalyst is loaded faces a case (metallic housing) 73. The case is provided with a negative screw by carving. A first peripheral cylinder 74 having a hexagonal portion and a positive screw portion is threadably attached to the aforementioned negative screw by means of a washer 75a. The first peripheral cylinder 74 is unitarily joined to a second peripheral cylinder 75 having a cross-section of ring. The second peripheral cylinder 75 is unitarily joined to the third peripheral cylinder 76. Thus, a case for accommodating and holding an electrode is composed of the first peripheral cylinder 74, the second peripheral cylinder 75, and the third peripheral cylinder 76. The length L from the bottom and of the first peripheral cylinder 74 to the top end of the third peripheral cylinder 76 is 40 mm or more. Incidentally, the first electrode 72 is connected to a honeycomb structure 77 of an electric heater 71 by means of a connecting member 145.

78 denotes a second electrode of a pole shape made of a metal such as iron. The second electrode has a discoid protrusion 81 in the upper-middle portion. A positive screw is formed in the base portion 79 by carving, thereby the second electrode is threadably attached to the first electrode 72 having a negative screw. Further, the second electrode 78 pierces an almost cylindrical, ceramic sleeve (insulating member) 80 made of alumina or the like. The top end of the ceramic sleeve 80 abuts on the protrusion 81.

Figure 11:
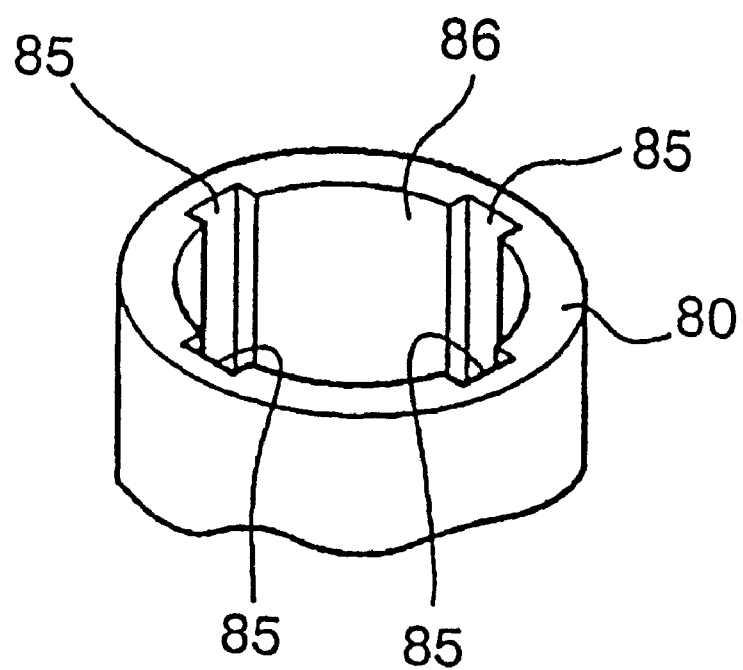
FIG. 11 is a perspective view showing the detail of the upper portion of a ceramic sleeve used in the electrode structure of the present invention.

To be specific, the ceramic sleeve 80 has a portion 80a having steps in predetermined portions of the inner surface of the ceramic sleeve 80. The inner surface around the top end is formed about perpendicularly and the open end is slightly tapered. That is, in the open end of the inner surface 86 of the ceramic sleeve 80, as shown in FIG. 11, four tapered depressions 85 are formed. The depressions 85 are filled with a compressed ceramic powder 87. The second electrode 78 and the second peripheral cylinder 75 rotate unitarily.

Between the lower portion of the ceramic sleeve 80 and the first peripheral cylinder 74 is positioned a first metallic sleeve 82. Specifically, a protrusion 80b formed on the ceramic sleeve 80 is locked by a notch formed on the first metallic sleeve 82. On the top of the first metallic sleeve 82 is positioned a second metallic sleeve 84 via a ceramic powder 83 such as talc, alumina, and magnesia. The second metallic sleeve 84 abuts on the first peripheral cylinder 74. The top of the first peripheral cylinder 74 is caulked so that the ceramic powder 83 between the first metallic sleeve 82 and the second metallic sleeve 84 is compressed. The compressed ceramic powder 83 ensures an electrical insulation against the outside.

In the gap over the protrusion 81 of the second electrode 78 between the second electrode 78 and the second peripheral cylinder 75 is filled up a glass insulator 82, which is a type of an elastic insulator having thermally resistant properties, so as to ensure an electrical insulation against the second peripheral cylinder 75.

A lead wire 89 is fixed to the top of the second electrode 78. A covered portion 90 of the lead wire 89 is protruded. To the top end of the third peripheral cylinder 76 is attached a rubber sealing member 91 having a thermal resistance.

Figure 12:
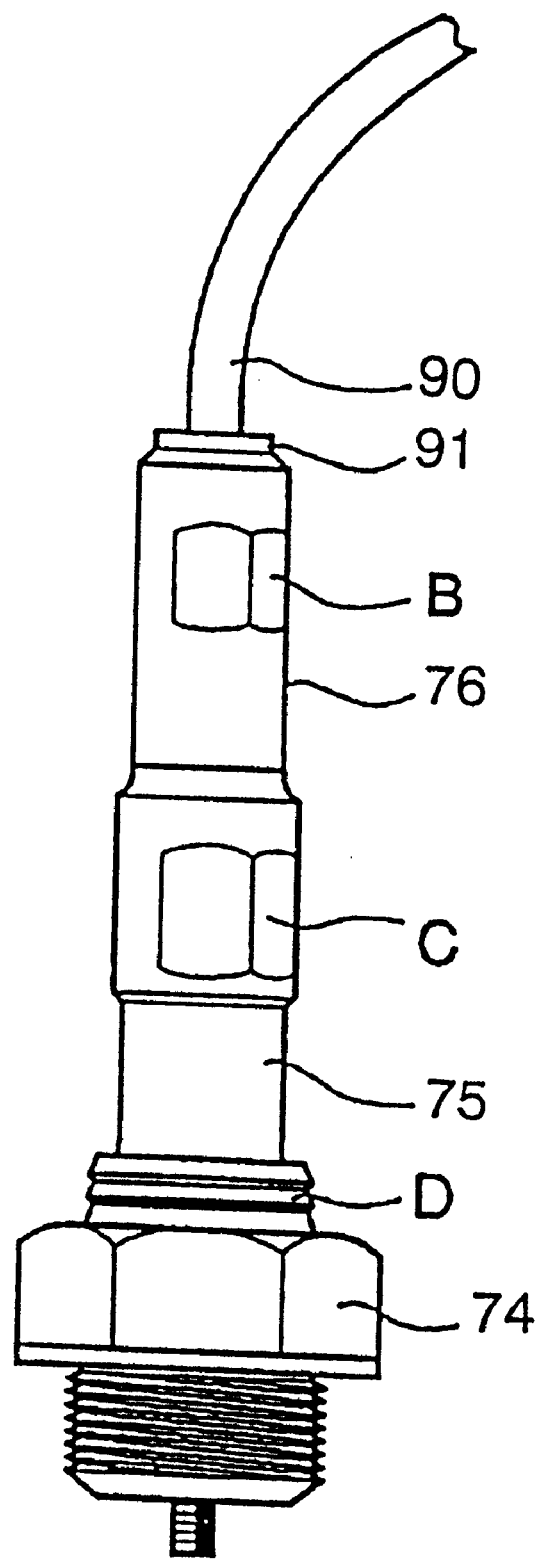
FIG. 12 is a plan view of the electrode structure shown in FIG. 10.

In the electrode structure of the embodiment, as shown in FIG. 12, B portion is crimped so as to unify the third peripheral cylinder 76 and the covered portion 90, C portion is caulked so as to unify the second and the third peripheral cylinders 75 and 76, the glass insulator 88, and the second electrode 78, and D portion is crimped so as to unify the first and the second peripheral cylinder 74 and 75, the second metallic sleeve 84, and the second electrode 78. The first peripheral cylinder 74 is rotated by turning a hexagonal portion with a tool or the like so as to be threadably attached to a case 73, thereby the second electrode 78 is threadably attached to the first electrode 72. Thus, the second electrode 78 can be easily incorporated into an electric heater 71. that is, the ceramic powder 87 is pressed and covers the second electrode 78 by threaded engagement of the first, the second, and the third peripheral cylinders 74, 75 and 76 with the case 73, and as a result, the second electrode 78 unitarily rotate with the first, the second, and the third peripheral cylinders 74, 75, and 76, and threadably attached to the first electrode 72.

Since, the predetermined length L from the bottom end of the first peripheral cylinder 74 to the top end of the third peripheral cylinder 76 (case for accommodating and holding an electrode) is specified to 40 mm or more, a rubber sealing member 91 can be mounted on the top of the third peripheral cylinder 76. That is, upon combustion in an internal combustion engine or the like, a temperature of the case 73 generally rises up to around 900° C.–100° C., while a heat-resisting temperature of a rubber sealing member is about 250° C. even if the rubber is a fluoro rubber having a thermal resistance, such as polytetrafluoroethylene (PTFB), etc. Therefore, it is difficult to mount the rubber sealing member on the portion near the case 73. Sealing around the electrode with a rubber sealing member is required to make an electrode structure of an electric heater waterproof. However, even a rubber sealing member having a thermal resistance has a heat-resisting temperature of at most around 250° C., and therefore, a rubber sealing member cannot be incorporated into an electrode structure and there has been no measure for a waterproof device. Therefore, water penetrated into the periphery of an electrode of an electric heater when an automobile ran through a puddle or upon a flood, thereby causing misoperation of heater.

Figure 13:
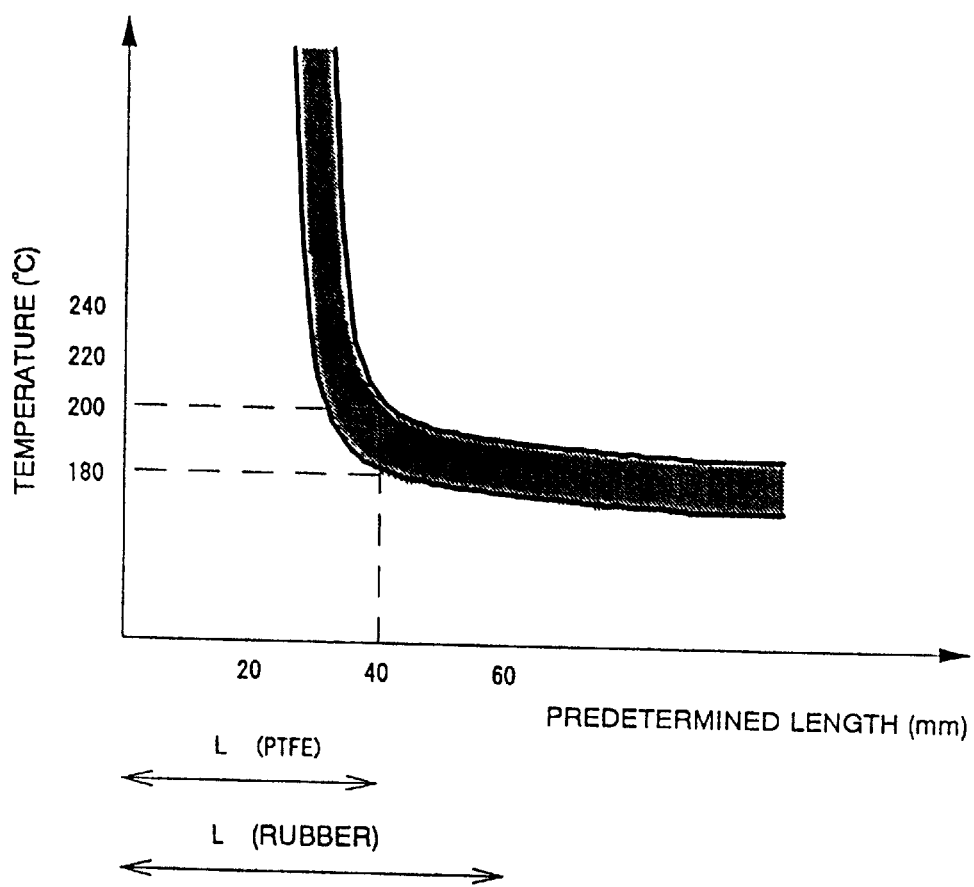
FIG. 13 is a characteristic view showing the relation between distance from electrode and temperature, in a conventional electric heater.

An electric heater was measured for temperatures near a case. The present inventors have found, from the results of the experiment, that temperature is 200° C. or lower in the place having distance of 40 mm or more from a periphery of the case as shown in FIG. 13. Accordingly, in the present embodiment, the predetermined length L was specified to 40 nm or more so that the temperature of a rubber sealing member 91 does not reach its heat-resisting temperature. That is, the second electrode 78 is provided so as to protrude from the first electrode 72, the second electrode pierces the ceramic sleeve 80, sealing against exhaust gas and electrical insulating are achieved by ceramic powders 83 and 87 and a glass insulator 88, and protection from water was achieved by mounting a rubber sealing material 91 on the top end of the third peripheral cylinder 76, the rubber sealing material having a distance of 40 mm or more from the first electrode 72. Since the first, the second, and the third peripheral cylinders 74, 75, and 76 are unified with the second electrode 78 or the like, by threadably attaching the first peripheral cylinder 74 to the case 73 by rotating the hexagonal portion, the second electrode is simultaneously connected with the first electrode 72 and can be easily incorporated into the electrode structure.

Figure 14:
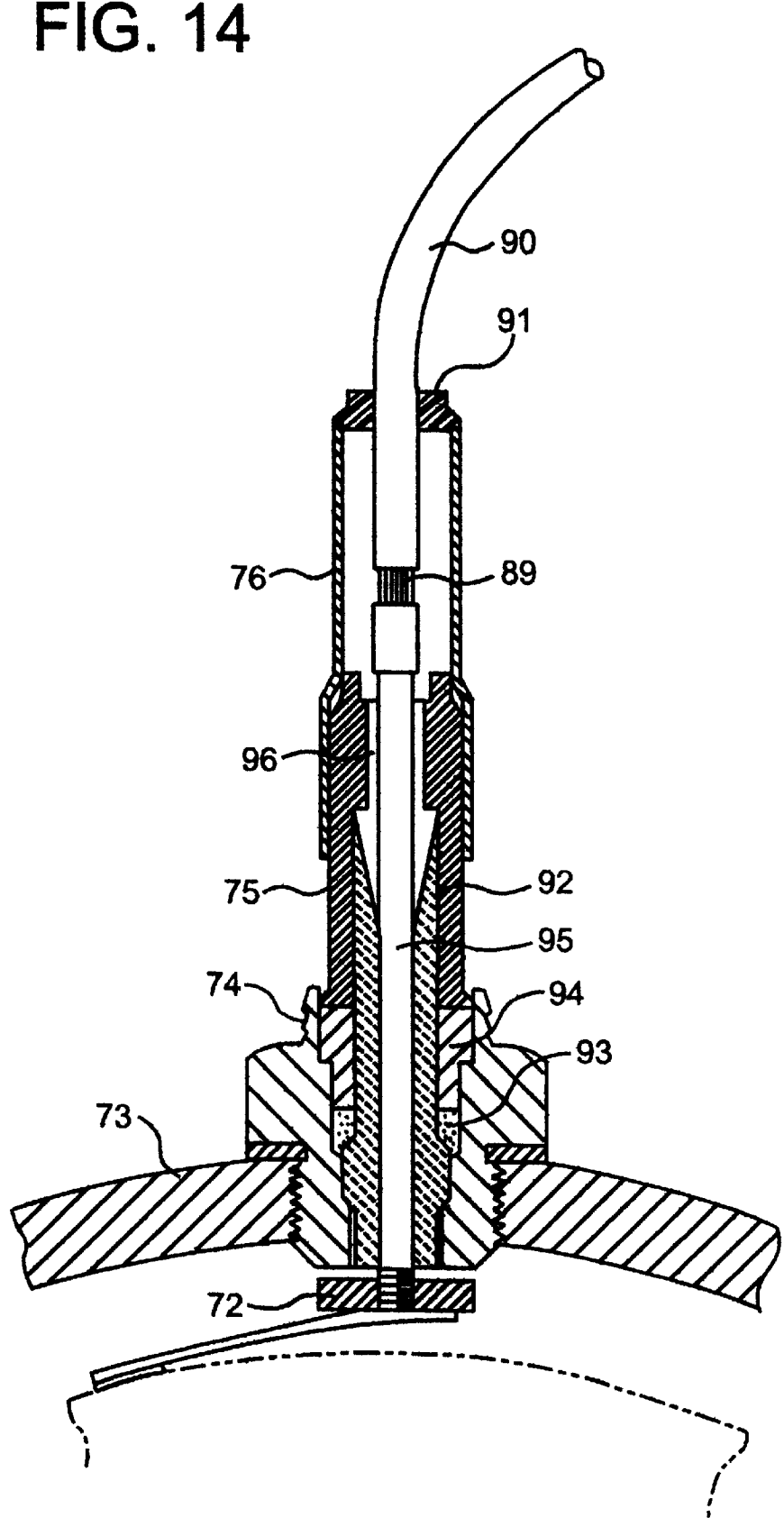
FIG. 14 is a sectional view showing still another embodiment of the electrode structure of the present invention.
Figure 15:
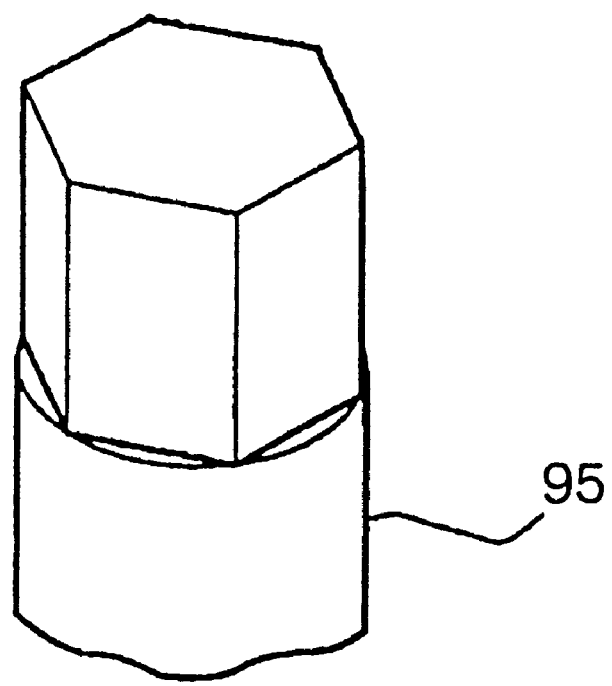
FIG. 15 is a perspective view of the front end of the second electrode used in the electrode structure shown in FIG. 14.
Figure 16:
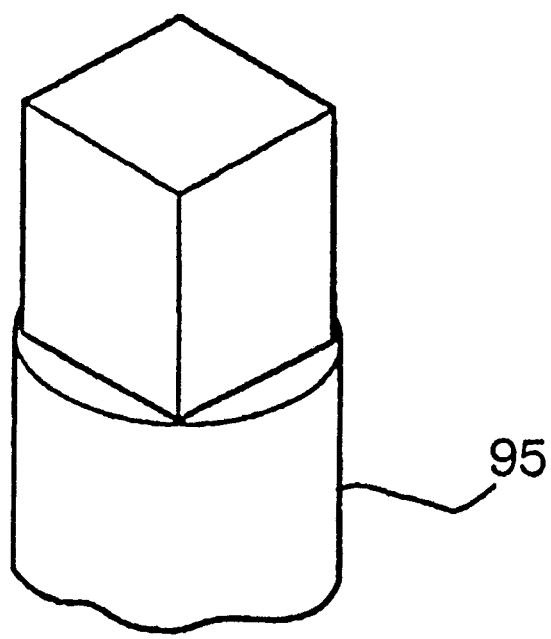
FIG. 16 is another perspective view of the front end of the second electrode used in the electrode structure shown in FIG. 14.

FIG. 14 shows still another embodiment of an electrode structure of the present invention. A depression is formed between a ceramic sleeve 92 and a first peripheral cylinder 74. A ceramic powder 93 is filled in the depression. On the ceramic powder 93 is placed a metallic sleeve 94, which abuts on the first peripheral cylinder 74. Like the aforementioned embodiment shown in FIG. 10, a metallic sleeve 94 and the first peripheral cylinder 74 are caulked, thereby compressing a ceramic powder 93 and ensuring an electrical insulation or the like. The top portion of a second electrode 95 is formed to have a shape of hexagon as shown in FIG. 15 or a rectangle as shown in FIG. 16, or a shape having a hexagonal hole (not shown). The second electrode 95 is connected with a first electrode 72 by a predetermined tool. The upper portion of the ceramic sleeve 92 is tapered off to the top. A glass insulator 96 is filled up in a space formed by the tapered portion of the ceramic sleeve 92, a second peripheral cylinder 75, and the second electrode 95, thereby the electrode structure is electrically insulated and sealed against exhaust gas.

Figure 17:
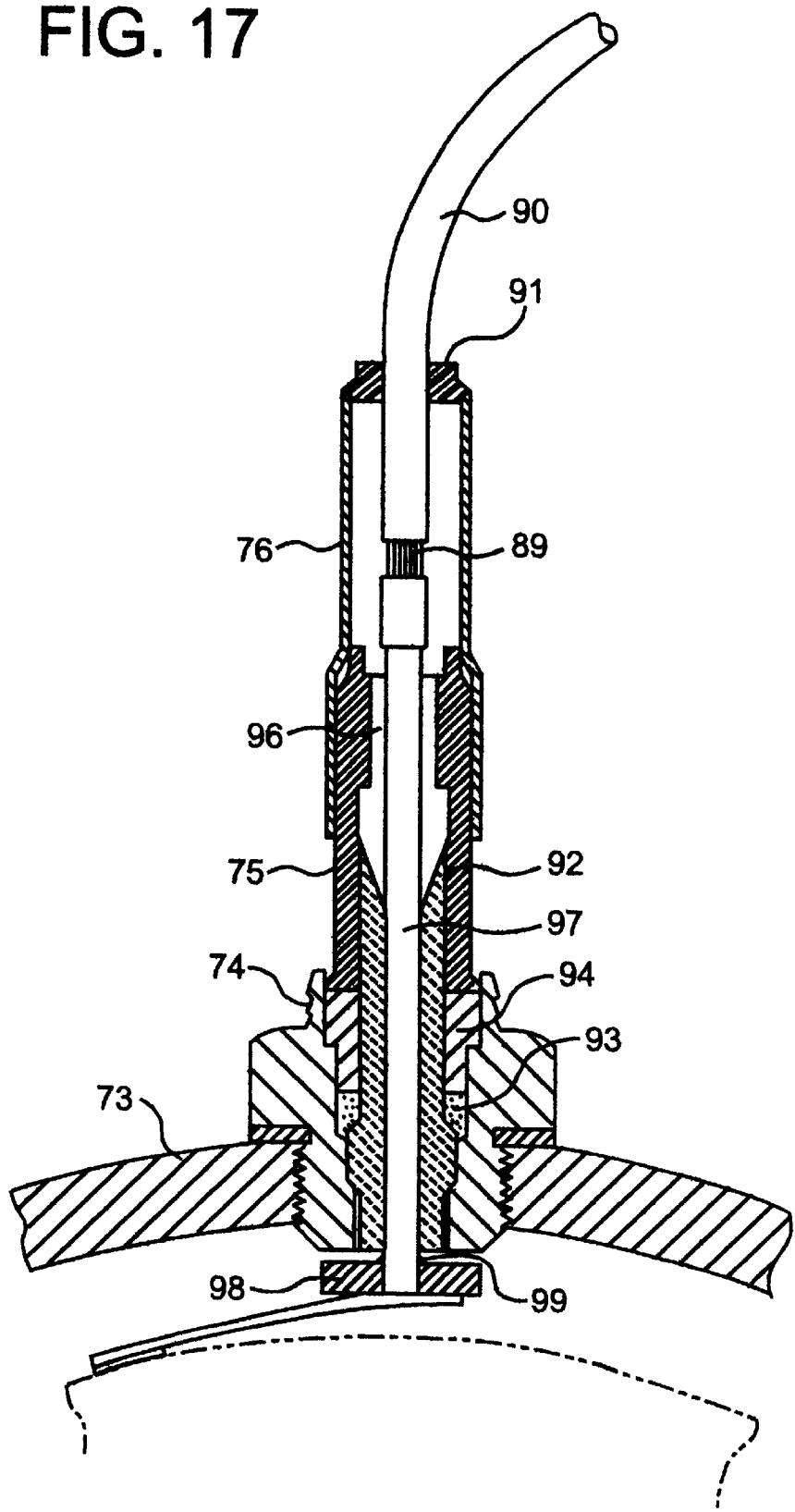
FIG. 17 is a sectional view showing still another embodiment of the electrode structure of the present invention.

In the aforementioned embodiment shown in FIG. 14, the second electrode 95 is fixed to the first electrode 72 by a threaded engagement. However, as an embodiment shown in FIG. 17, a second electrode 97 may be connected to a first electrode 98 by welding (solder 99).

Figure 18:
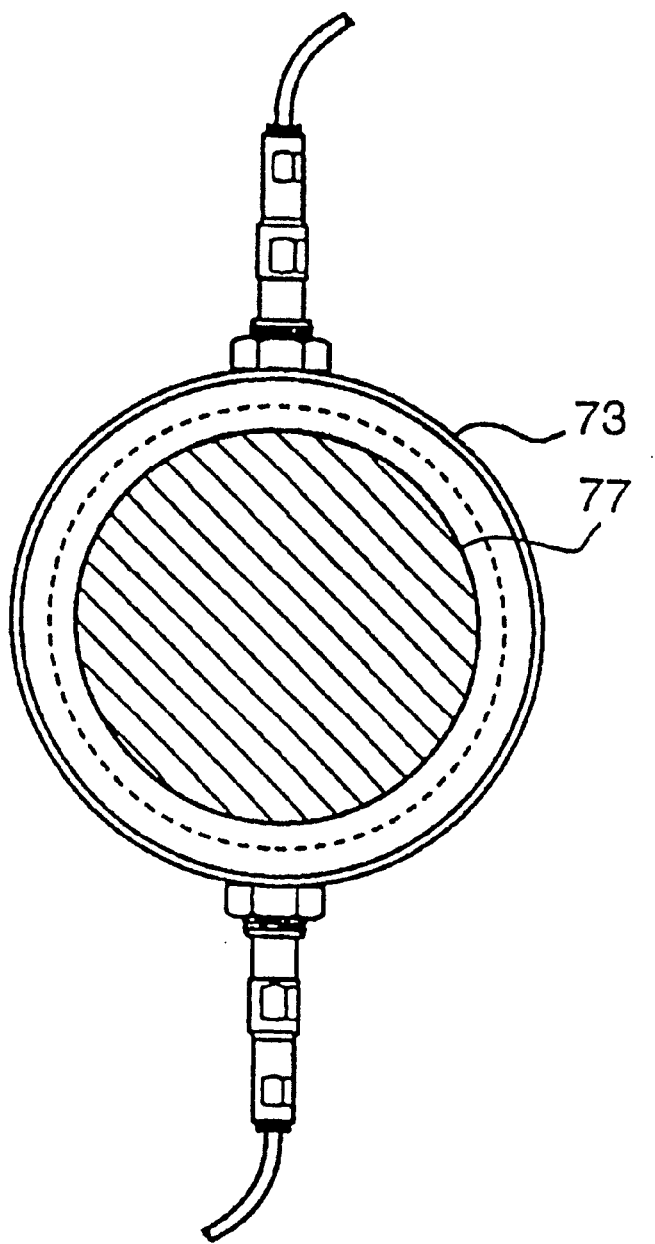
FIG. 18 is a plan view of a two-electrode electric heater using the electrode structure of the present invention.
Figure 19:
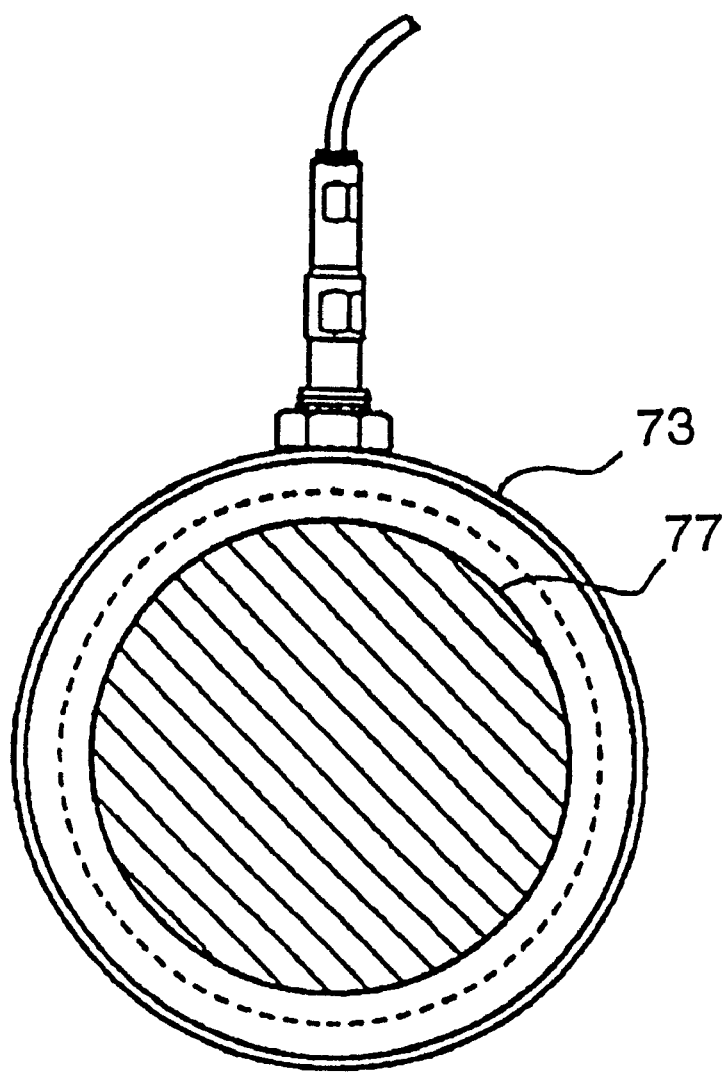
FIG. 19 is a plan view of a one-electrode electric heater using the electrode structure of the present invention.
Figure 20:
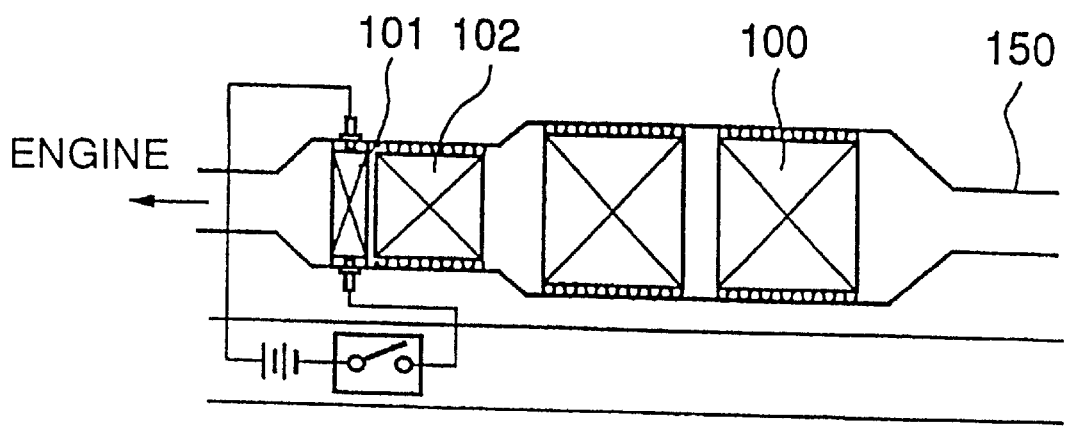
FIG. 20 is a view showing the structure of the key portion of the exhaust system of internal combustion engine in an automobile.
Figure 22:
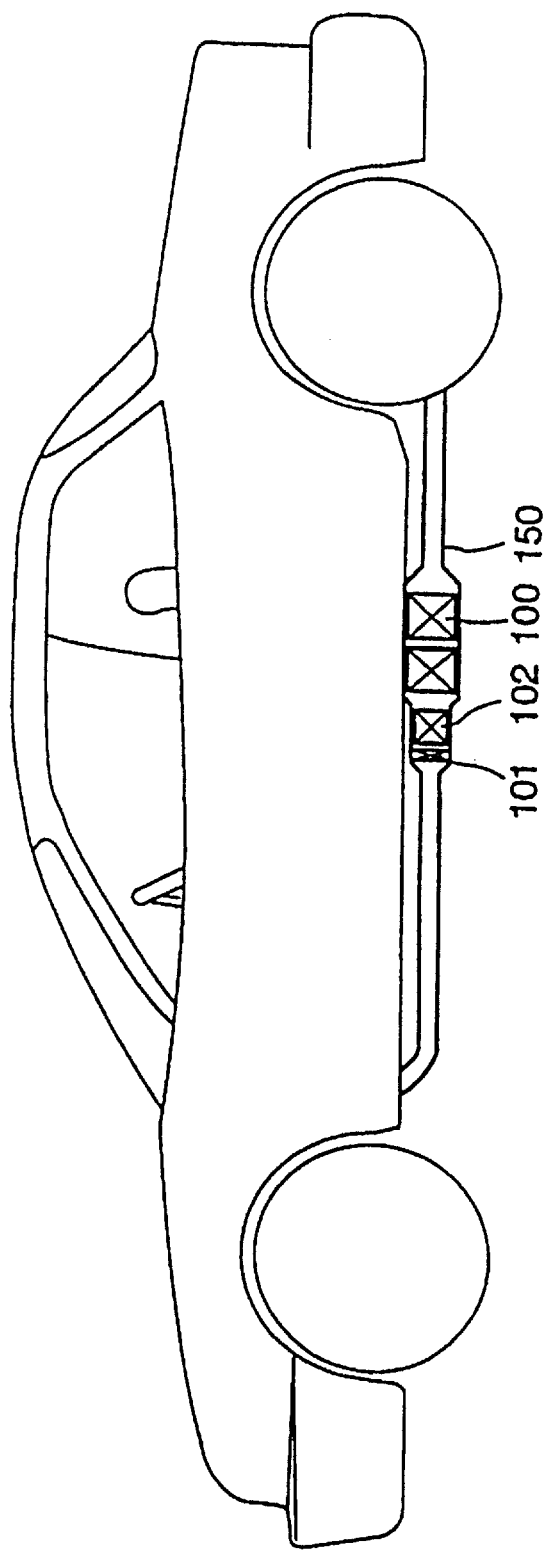
FIG. 22 is a view showing the arrangement of the exhaust system of internal combustion engine in an automobile.

Incidentally, the present invention can be applied to both an electric heater having two electrodes and an electric heater having one electrodes. The former is shown in FIG. 18, and the latter is shown in FIG. 19 in which only an end of the electrode is attached to the heater.

In the present electrode structure, the electrode and the lead wire are connected by various methods. Embodiments of such connecting methods are shown in FIGS. 23–29.

Figure 23:
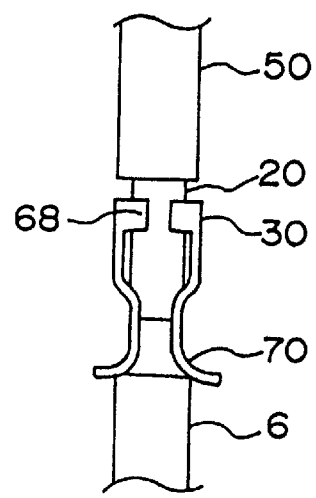
FIG. 23 is a partial view showing an embodiment of the connection between electrode and lead wire, used in the electrode structure of the present invention.

In FIG. 23, an electrode 6 and a lead wire 20 are connected via a connecting member 30. The connecting member 30 is fixed to the lead wire 20 by the nail portion 68 of the connecting member 30 formed at the one end. The supporting portion 70 of the connecting member 30 formed at the other end is curved outwardly and is projection-welded to the electrode 6 via the curvature.

Figure 24:
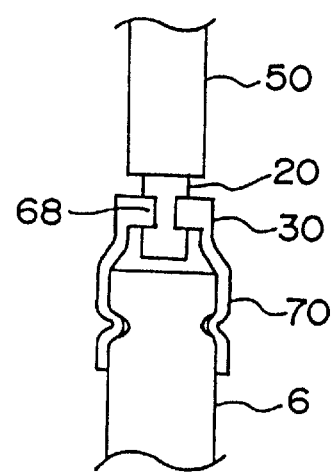
FIG. 24 is a partial view showing another embodiment of the connection between electrode and lead wire, used in the electrode structure of the present invention.

In FIG. 24, a connecting member 30 is fixed to a lead wire 20 by the nail portion 68 of the connecting member 30 formed at the one end and is fixed to an electrode 6 by caulking, from outside, the electrode-holding portion 70 of the connecting member 30 formed at the other end. The gap between the electrode 6 and the connecting member 30 may be spot-welded.

Figure 25:
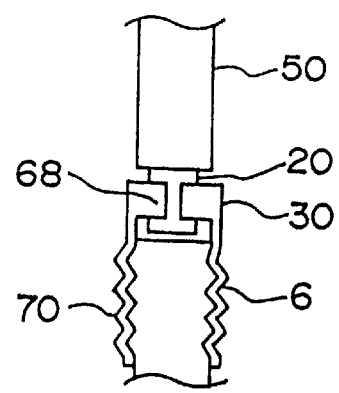
FIG. 25 is a partial view showing still another embodiment of the connection between electrode and lead wire, used in the electrode structure of the present invention.

In FIG. 25, a connecting member 30 is fixed to a lead wire 20 by the nail portion 68 of the connecting member 30 formed at the one and, and is fixed to an electrode 6 by engaging the female screw portion of the connecting member 30 formed at the other end, with the male screw portion formed on the upper portion of the electrode 6.

Figure 26:
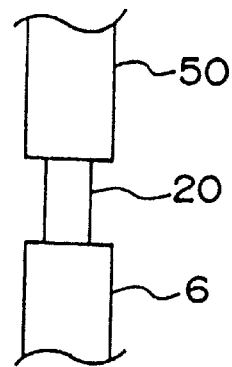
FIG. 26 is a partial view showing still another embodiment of the connection between electrode and lead wire, used in the electrode structure of the present invention.

In FIG. 26, a lead wire 20 is welded directly to an electrode 6.

Figure 27:
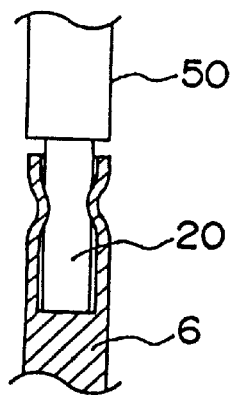
FIG. 27 is a partial view showing still another embodiment of the connection between electrode and lead wire, used in the electrode structure of the present invention.

In FIG. 27, one end of an electrode 6 is formed in a cylindrical shape; into the cylindrical portion is inserted one end of a lead wire 20; the cylindrical portion is caulked from outside; thereby, the lead wire 20 is fixed to the electrode 6.

Figure 28:
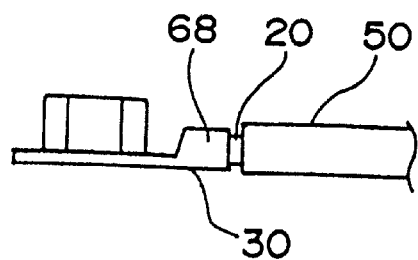
FIG. 28 is a partial view showing still another embodiment of the connection between electrode and lead wire, used in the electrode structure of the present invention.

FIG. 28 is an embodiment in which an electrode 6 and a lead wire 20 are connected at right angles. A nut-shaped connecting member 30 is connected to one end of a lead wire 20, and the connecting member 30 is fixed to one end of an electrode 6 by the use of a bolt 52.

Figure 29:
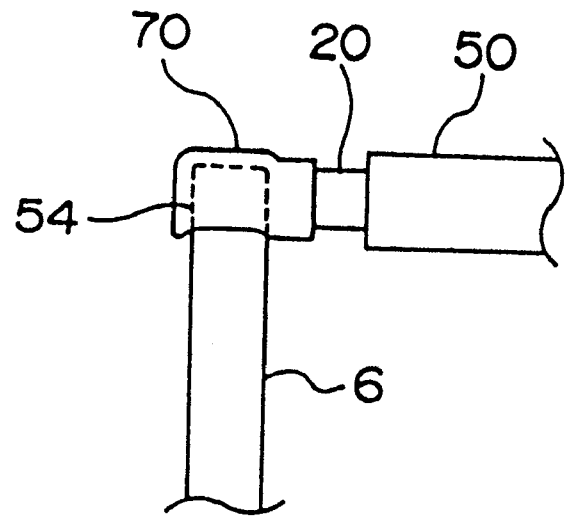
FIG. 29 is a partial view showing still another embodiment of the connection between electrode and lead wire, used in the electrode structure of the present invention.

FIG. 29 is also an embodiment in which an electrode 6 and a lead wire 20 are connected at right angles, as in FIG. 28. At one end of a lead wire 20 is formed an electrode-holding portion 70 having a hole 54 capable of accommodating one end of an electrode 6, and the hole 54 and one end of the electrode 6 are engaged and connected with each other.

[Evaluation]

The following water absorption test was conducted for the electrode structure of FIG. 1 (an embodiment of the present electrode structure) and a conventional electrode structure shown in FIG. 21(a).

A water absorption test was conducted by allowing an electrode structure to stand in a state of 100% humidity and measuring the change with time, of insulation resistance between the electrode and the case. As a result, the present electrode structure maintained a high insulation resistance of 1 MΩ or more even after having been allowed to stand for 200 minutes; in contrast, in the conventional electrode structure, the insulation resistance decreased to less than 1 MΩ after having been allowed to stand for 30 minutes.

As stated above, the electrode structure of the present invention, into which one end of a lead wire connecting thereto is inserted, is superior in assembling efficiency, electrical insulation, exhaust gas sealability and waterproofness. Therefore, when an automobile having an electric heater using such an electric structure is driven on puddles of roads or during flooding, there is no water adhesion onto the electrode and misoperation of the heater can be prevented.

What is claimed is:

1. An electrode assembly comprising:
    (a) an electrode structure comprising:
        a metallic electrode;
        a case for accommodating and holding the electrode and one end of a lead wire connecting to the electrode, the case having (1) an upper portion with a diameter smaller than the diameter of the remainder of the case and (2) a length sufficient to house a waterproof member completely therein;
        an insulating member interposed between the electrode and the case in order to ensure insulation between the electrode and the case, and
        a waterproof member interposed between the case and the lead wire at the upper portion of the case apart from the insulating member in order to prevent the passage of water through the gap between the case and the lead wire and
    (b) a conductive substance connected to the electrode structure and accommodated in a metallic housing, in order to apply electricity to the conductive substance.

2. An electrode assembly according to claim 1, wherein the conductive substance is a metallic honeycomb structure.

3. An electrode assembly according to claim 1, wherein the waterproof member is a heat-resistant and insulating organic compound or a glass.

4. An electrode assembly according to claim 3, wherein the organic compound is a fluorine-containing organic compound.

5. An electrode structure according to claim 1, wherein at least one crimped portion is formed at the tapered upper end portion of the case.

6. An electrode assembly according to claim 1, wherein a gap between the case and the waterproof member and a gap between the waterproof member and the lead wire are sealed with an adhesive.

7. An electrode assembly according to claim 1, wherein the insulating member is constituted by a first insulator, a second insulator and an inorganic powder filled between the first and second insulators.

8. An electrode assembly according to claim 7, wherein the first insulator and the second insulator are each made of a ceramic.

9. An electrode structure according to claim 7, wherein the inorganic powder is filled by pressurization.

10. An electrode assembly according to claim 1, wherein the insulating member is constituted by a first insulator, a second insulator and a cement sealing material filled between the first and second insulators.

11. An electrode assembly according to claim 1, wherein a gap between the electrode and the insulating member and a gap between the insulating member and the case are each sealed with a metal sealing material.

12. An electrode assembly according to claim 11, which further comprises, between the electrode and the case, a spring member for absorbing the difference in thermal expansion between the electrode, the case and the insulating member and a pressing member for transmitting a load to the spring member.

13. An electrode assembly according to claim 12, wherein the pressing member is a nut fitted to the electrode.

14. An electrode assembly according to claim 12, wherein the pressing member is fixed to the electrode by welding.

15. An electrode assembly according to claim 12, wherein the pressing member is fixed to the electrode by crimping.

16. An electrode assembly according to claim 1, wherein the insulating member is an insulating coating material coated on at least one of the electrode and the case.

17. An electrode assembly according to claim 16, wherein the gap between the electrode and the case is sealed with an inorganic powder.

18. An electrode assembly according to claim 16, wherein the insulating coating material is an alumina and is plasma-sprayed.

19. An electrode assembly according to claim 16, wherein the insulating coating material is a ceramic.

20. An electrode assembly according to claim 1, wherein the insulating member is an insulating coating material coated on the electrode and the gap between the case and the insulating coating material is sealed with a metal sealing material.

21. An electrode assembly according to claim 1, wherein the insulating member is an insulating coating material coated on the case and a gap between the electrode and the insulating coating material is sealed with a metal sealing material.

22. An electrode assembly according to claim 1, wherein the lead wire is covered with a covering material which functions also as a waterproof member.

23. An electrode structure according to claim 1 wherein said electrode assembly is housed within an electric heater.

24. An electrode assembly according to the claim 1, wherein the metallic electrode has an uncoated surface throughout.

25. An electrode assembly according to claim 1, wherein the case is formed of a single component.

26. An electrode assembly according to claim 1, wherein the case is comprised of at least two separate components, and the components partially fit within each other.

27. An electrode assembly according to claim 26, wherein the insulating member is interposed between the electrode and the first case.

28. An electrode assembly according to claim 1, wherein said waterproof member has no groove.

29. An electrode assembly according to claim 1, wherein said upper portion of the case has an extremity that is outwardly beveled or straight.

30. An electrode structure of an electric heater, comprising:

a first electrode;

a second electrode of a cylinder shape, having a base portion connected with the first electrode and a top end portion connected with a lead wire;

an insulating member having a thermal resistance, pierced by the second electrode;

an elastic insulator having a thermal resistance, covering at least a portion of the second electrode;

a case for accommodating and holding the second electrode, having a predetermined length L; and a rubber sealing member attached to the top end of the case.

31. An electrode structure of an electric heater according to claim 30, wherein said predetermined length L is 40 mm or more.

32. An electrode structure of an electric heater according to claim 30, wherein the second electrode is fixed to the case by means of said elastic insulator or said insulating member and is thread-mounted on the first electrode.

33. An electrode structure of an electric heater according to claim 32, wherein said ceramic powder is filled up in a gap between said insulating member and the second electrode, and said glass insulator is positioned between said case and the second electrode.

34. An electrode structure of an electric heater according to claim 30, wherein the top end portion of the second electrode is formed to have a shape of a hexagon, a rectangle, or having a hole that is hexagonal.

35. An electrode structure of an electric heater according to claim 30, wherein the base portion of the second electrode is connected with the first electrode by welding.

* * * * *